Oct. 6, 1970 H. M. WINTERS 3,533,091
SWITCHING CIRCUIT FOR RECHARGING PARASITIC CAPACITANCE OF A MEMORY MATRIX
Filed June 24, 1968
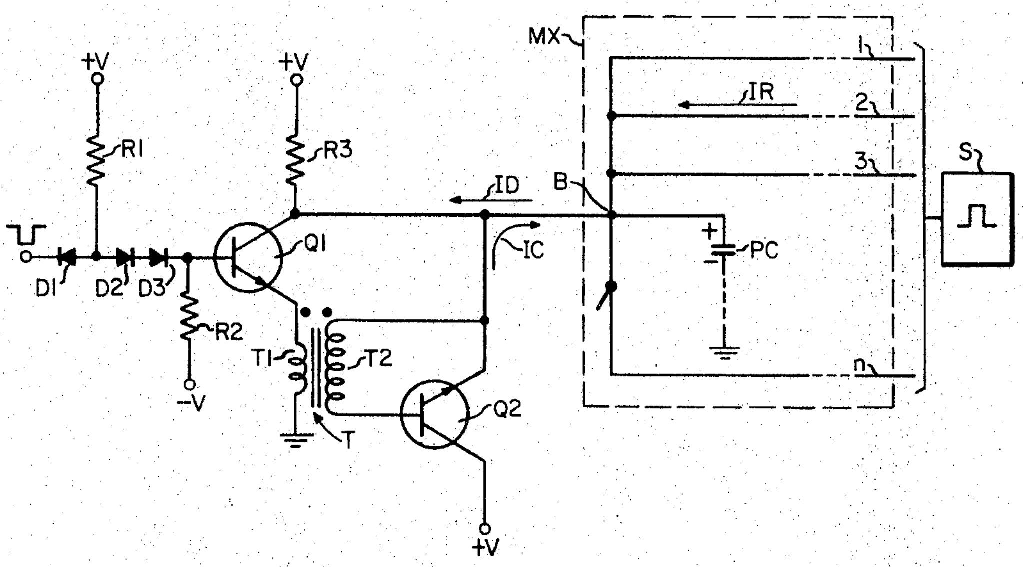
INVENTOR.
HILARY M. WINTERS
BY Russell M. Mueller[signature]
AGENT United States Patent Office 3,533,091

Patented Oct. 6, 1970

3,533,091

SWITCHING CIRCUIT FOR RECHARGING PARASITIC CAPACITANCE OF A MEMORY MATRIX

Hilary M. Winters, Forest Park, Ill., assignor to Automatic Electric Laboratories, Inc., Northlake, Ill., a corporation of Delaware Filed June 24, 1968, Ser. No. 739,533
Int. Cl. G11c 7/02, 5/02
U.S. Cl. 340—174 2 Claims

ABSTRACT OF THE DISCLOSURE

A current switch connected to a switch bus of a memory system utilizes a transformer driven gate circuit, also connected to the same bus, for recharging the parasitic capacitance of a memory matrix to speed up the cycle time of the system.

BACKGROUND OF THE INVENTION

Field of the invention

This invention relates to switching circuits, and is particularly concerned with current switching circuits which may be utilized to automatically recharge the parasitic capacitance of a memory matrix.

Description of the prior art

It is well known that large matrices are characterized by a large parasitic capacity which is the summation of individual capacitances existing between the individual drive lines and between the drive lines and ground. Before a read current can be passed through a selected line this parasitic capacitance must be discharged. Conversely, at the end of an interrogation, this capacitance must be recharged before the next cycle may begin.

Generally speaking, there is little problem in discharging the parasitic capacitance since a current switch, when turned on, offers a low impedance discharge path of a small R-C time constant. When the current switch is turned off, however, this capacitance must be recharged through a high impedance, and accordingly, at a rate determined by a relatively high time constant.

Various circuits have been employed in the prior art for decreasing the recharging time of the parasitic capacitance. These circuits have been effective to solve the recharging problem at the cost of requiring additional circuits for recharging and the provision of additional logic circuits for timing their operation.

SUMMARY OF THE INVENTION

By way of contrast to the prior art circuits, the present invention accomplishes recharging of the parasitic capacitance by the provision of a simple gating circuit in a current switch, said gating circuit having a minimum number of components for recharging and automatically controlling the recharging of said capacitance through a small time constant. A first transistor circuit of the present current switch provides a first low impedance collector-emitter path for discharging parasitic capacitance. In addition, a second transistor circuit provides a low impedance emitter-collector path for recharging said capacitance, automatically, under the control of the current flow in the aforementioned first collector-emitter path.

DESCRIPTION OF THE DRAWINGS

The invention, its construction and operation, will be best understood from the following detailed description in conjunction with accompanying drawing the single figure of which is a circuit diagram of a preferred embodiment. In the drawing, a memory matrix MX comprises a plurality of drive lines 1–*n* which cause the existence of a parasitic capacitance PC which is normally charged in the direction indicated by the polarity markings adjacent thereto. The read current drivers, which pulse selected drive lines in a manner well known in the art, are symbolized by the block S which is connected to each of the drive lines.

A current switch, shown connected to each of the drive lines via a bus conductor B, comprises transistor Q1 which has its collector connected to the matrix drive lines and which is normally biased off by way of sources +V, −V, resistors R1–R3, diodes D1–D3 and the primary winding T1 of transformer T. A second transistor Q2 has its emitter connected to the matrix drive lines and the collector of transistor Q1 via bus conductor B and its emitter-base circuit connected to the secondary winding T2 of transformer T. Transistor Q2 is normally biased off by way of source +V, and resistor R3. Each of these transistors has an electrode connected to the parasitic capacitance PC and, as will become evident from the detailed description, provides a low impedance path for discharging and charging the parasitic capacitance.

DETAILED DESCRIPTION

With both transistors nonconductive and capacitance PC charged as shown, a suitable pulse applied to the input terminal at diode D1 causes a potential rise at the anode of diode D2 and at the base of transistor Q1 to overcome the base-emitter bias of transistor Q1. Transistor Q1 turns on to provide a low impedance discharge path for capacitance PC (current ID). The potential of the collector of transistor Q1 and of the emitter of transistor Q2 lowers as a result of the conduction of transistor Q1; however, transistor Q2 remains nonconductive due to the current through the primary winding of the transformer which causes the reverse bias to be maintained across the base-emitter circuit via secondary winding T2. With transistor Q1 conductive and capacitance PC discharged therethrough, normal interrogation current, referenced IR on drive line 2, may be supplied from source S to a selected drive line and transistor Q1.

At the termination of the input pulse to transistor Q1 the latter is turned off and as a result primary winding of the transformer experiences a decreasing current which induces a voltage in the secondary winding in the direction to forward bias transistor Q2 and permit current IC to recharge capacitance PC through the low impedance, short time constant emitter-collector circuit of transistor Q2. Current IC only flows while the current is decreasing in the primary winding of the transformer and is automatically cut off when the decreasing current through transformer winding T1 can no longer maintain transistor Q2 conductive. Only a short period of conduction is needed to recharge the lines via transistor Q2, after which the matrix may be immediately re-interrogated.

In an experimented model of a transformer type memory matrix, circuits constructed in accordance with the teachings of the present invention required only 100 nanoseconds recharging time as compared with 4 microseconds required for the same current switch without the gating circuit o ftransistor Q2 being connected in circuit. The only critical condition is that the current switch must be turned off before or simultaneously with the driver circuits to allow fast recharging and to prevent a diversion of the charging current through transistor Q1. This is, however, merely a clock pulse requirement and does not present a problem.

Many changes and modifications of the invention may be made by those skilled in the art without departing from the spirit and scope of the invention as defined in the appended claims.

What is claimed is:

1. A magnetic memory system including a matrix having a bus conductor normally exhibiting a parasitic capacitance,
   a source of current pulses connectable to said bus conductor,
   a first switch and a second switch connected to said bus conductor,
   control means connected to said first switch for turning said first switch on and off,
   said first switch when turned on by said control means causing said parasitic capacitance to be discharged and permitting said current to flow from said source via said bus conductor, and
   means connected to said first and second switches, the last-mentioned means momentarily turning said second switch on responsive to the cessation of the flow of said current upon said first switch being turned off by said control means, for recharging said parasitic capacitance.

2. A magnetic memory system according to claim 1 in which said first and second switches include first and second transistors respectively, each of said transistors having first, second, and third electrodes, a source of direct current, a source of reference potential, said first transistor having its first electrode connected to said control means, its second electrode connected to said bus connector, and its third electrode connected to said source of reference potential, said second transistor having its first electrode connected to said direct-current source and its second electrode connected to said bus conductor, said means connected to said first and second switches including a transformer having a primary winding connected between said third electrode of said first transistor and said reference potential and a secondary winding connected between said second and third electrodes of said second transistor.

References Cited

UNITED STATES PATENTS 3,222,658 12/1965 Bruce et al. ---------- 340—174

STANLEY M. URYNOWICZ, Jr., Primary Examiner